United States Patent
Shimizu et al.

(10) Patent No.: US 9,745,443 B2
(45) Date of Patent: Aug. 29, 2017

(54) INORGANIC FILLER-CONTAINING EPOXY RESIN CURED PRODUCT AND LAMINATE INCLUDING THE SAME

(71) Applicant: TDK CORPORATION, Tokyo (JP)

(72) Inventors: Yutaka Shimizu, Tokyo (JP); Tsuyoshi Sugiyama, Tokyo (JP); Hiroshi Shutoh, Tokyo (JP); Masaaki Yamashita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/708,715

(22) Filed: May 11, 2015

(65) Prior Publication Data

US 2015/0329695 A1    Nov. 19, 2015

(30) Foreign Application Priority Data

May 15, 2014    (JP) .................................. 2014-101495

(51) Int. Cl.
| | |
|---|---|
| *B32B 27/38* | (2006.01) |
| *B32B 27/26* | (2006.01) |
| *B32B 27/20* | (2006.01) |
| *C08G 59/50* | (2006.01) |
| *C08K 3/22* | (2006.01) |
| *C08K 5/18* | (2006.01) |
| *C08K 5/13* | (2006.01) |
| *C08L 63/00* | (2006.01) |

(52) U.S. Cl.
CPC .................. *C08K 3/22* (2013.01); *C08K 5/13* (2013.01); *C08K 5/18* (2013.01); *C08K 2003/222* (2013.01)

(58) Field of Classification Search
None
See application file for complete search history.

(56) References Cited

U.S. PATENT DOCUMENTS

| | | | |
|---|---|---|---|
| 5,344,980 A * | 9/1994 | Aslam ..................... | C07C 37/11 564/248 |
| 2013/0337269 A1 | 12/2013 | Ohtsuka et al. | |
| 2015/0118498 A1* | 4/2015 | Sugiyama .............. | C08G 59/56 428/413 |

FOREIGN PATENT DOCUMENTS

| | | |
|---|---|---|
| JP | 2004-002573 A | 1/2004 |
| KR | 10-2014-0047581 A | 4/2014 |
| WO | 93/14140 A1 | 7/1993 |

OTHER PUBLICATIONS

Wereszczak, Andrew A. et al., "Thermally Conductive MgO-Filled Epoxy Molding Compounds," IEEE Transactions on Components, Packaging and Manufacturing Technology, vol. 3, No. 12, Dec. 2013, pp. 1994-2005.
Wan et al., "The Modifying Heat Conductivity and transparent Ethoxyline Resin Used in LED Packaging," Journal of Taiyuan University of Technology, vol. 39, No. 5, 2008.

* cited by examiner

*Primary Examiner* — Michael J Feely
(74) *Attorney, Agent, or Firm* — Oliff PLC

(57) ABSTRACT

An inorganic filler-containing epoxy resin cured product contains a magnesium oxide powder and has a maximum thermogravimetric mass loss rate $\Delta R_{max}$ of −0.20 mass percent/° C. or more within a temperature range of 300° C. to 500° C. The filling factor of the magnesium oxide powder in the inorganic filler-containing epoxy resin cured product is 45% to 63% by volume.

4 Claims, 3 Drawing Sheets

INORGANIC FILLER-CONTAINING EPOXY RESIN CURED PRODUCT AND LAMINATE INCLUDING THE SAME

The present invention relates to an inorganic filler-containing epoxy resin cured product and a laminate including the same.

BACKGROUND

In recent years, organic insulating materials used in adhesives, casting materials, sealants, molding materials, laminates, composite substrates and the like, mainly containing thermosetting resins have been required to have a high thermal conductivity for heat dissipation in keeping with trends toward the electrification of automotive power, the high integration of semiconductors, and the widespread use of LED lighting. Furthermore, the organic insulating materials are required to have a high thermal conductivity of, for example, 2.0 W/(m·K) or more because of the increase in temperature of usage environments.

Epoxy resin compositions having a mesogenic group are known as thermosetting resin compositions with high thermal conductivity. For example, Patent Document 1 discloses a thermosetting resin composition prepared by blending an epoxy resin (epoxy prepolymer) with a curing agent containing 1,5-diaminonaphthalene, the epoxy resin being produced by the reaction of a phenol compound such as 4,4'-dihydroxybiphenyl with an epoxy compound with a specific structure having a biphenyl group which is a mesogenic group.

Further, the above mentioned epoxy resin composition may contain filler such as metal oxides, metal hydroxides, or inorganic ceramics. It has been disclosed that for example, an inorganic powder filler such as alumina, silica, magnesium oxide, or aluminium hydroxide; a fibrous filler such as a glass fiber, a pulp fiber, a synthetic fiber, or a ceramic fiber; a colorant; or the like can be added into the composition.

PATENT DOCUMENT

Patent Document 1: JP-A-2004-2573

SUMMARY

However, the thermosetting resin composition disclosed in Patent Document 1 is insufficient in thermal conductivity. In addition, investigations made by the inventors have revealed that a cured resin product obtained from the thermosetting resin composition is insufficient in heat resistance and has a problem of a tracking phenomenon in which carbonized conductive paths are formed by the repetition of micro-discharge on the surface of an insulator with insufficient heat resistance to cause dielectric breakdown.

In Patent Document 1, a cured resin product is obtained from the epoxy resin (epoxy prepolymer), which is produced by the reaction of the phenol compound such as 4,4'-dihydroxybiphenyl with the epoxy compound with the specific structure having the biphenyl group which is a mesogenic group. However, the cured resin product has reduced crosslink density and a large thermogravimetric mass loss at high temperature (300° C. to 500° C.) because a plurality of mesogenic groups are linearly arranged through flexible bonds. As a result, sufficient tracking resistance is probably not ensured.

In addition, the epoxy resin compositions may contain other filler such as a metal oxide, a metal hydroxide, an inorganic ceramic, or another filling material. In particular, magnesium oxide is inexpensive, has a high thermal conductivity (40 W/(m·K) to 62 W/(m·K)) and a high volume resistivity (>$10^{14}$ Ω·cm), and thus is preferred as an insulating filler. However, magnesium oxide is soluble in water and an aqueous solution of ammonium chloride. Thus, in the case of using magnesium oxide in combination with the resin composition disclosed in Patent Document 1, there is a problem that tracking resistance which is one of reliability characteristics of organic insulating materials cannot be sufficiently ensured.

The present invention has been made in view of the above circumstances. It is an object of the present invention to provide an inorganic filler-containing epoxy resin cured product having a high thermal conductivity and a tracking resistance, as well as a laminate including the same.

The present inventors have investigated the compositions of various reactants using magnesium oxide powders, epoxy compounds, and specific curing agents in combination. The inventors have found that thermogravimetric mass loss exhibiting a certain behavior within a temperature range of 300° C. to 500° C. is effective for an inorganic filler-containing epoxy resin cured product having an excellent heat resistance at a high environmental temperature as well as a laminate including the inorganic filler-containing epoxy resin cured product. This has led to the completion of the present invention.

The present invention is characterized in that the filling factor of the magnesium oxide powder in the inorganic filler-containing epoxy resin cured product is 45% to 63% by volume, and the inorganic filler-containing epoxy resin cured product has a maximum thermogravimetric mass loss rate $\Delta R_{max}$ of −0.20 mass percent/° C. or more within a temperature range of 300° C. to 500° C.

Since the maximum thermogravimetric mass loss rate $\Delta R_{max}$ of the inorganic filler-containing epoxy resin cured product is −0.20 mass percent/° C. or more within a temperature range of 300° C. to 500° C., the drastic change in morphology of the surface of the epoxy resin cured product can be avoided, and the effect of maintaining a high heat resistance can be achieved.

Since the inorganic filler-containing epoxy resin cured product contains the magnesium oxide powder, the high heat dissipation of the inorganic filler-containing epoxy resin cured product can be maintained. Therefore, the heating of the cured epoxy resin product to high temperature can be avoided, and the decomposition of resin due to heat can be effectively avoided even at high temperature because of a synergistic effect with the high heat resistance of the inorganic filler-containing epoxy resin cured product. This allows the tracking resistance of the inorganic filler-containing epoxy resin cured product against high voltage to be maintained.

Furthermore, if 45% to 63% by volume of the magnesium oxide powder is filled in the cured epoxy resin product, the high thermal conductivity of the magnesium oxide powder allows the inorganic filler-containing epoxy resin cured product to have a high thermal conductivity property (2.0 W/(m·K) or more).

The cured epoxy resin product according to the present invention preferably has a mesogenic group. Thus, a higher thermal conductivity can be achieved by a synergistic effect of enhancing stacking properties of benzene rings between epoxy compounds with each other as well as the epoxy compounds and the other compounds having mesogenic groups.

The cured epoxy resin product according to the present invention preferably at least contains an epoxy compound as well as 1,3,5-tris(4-aminophenyl)benzene or 1,3,5-tris(4-hydroxyphenyl)benzene.

In the 1,3,5-tris(4-aminophenyl)benzene and 1,3,5-tris(4-hydroxyphenyl)benzene, the molecular structure of 1,3,5-trisphenylbenzene, which is a main skeleton, is rigid and has a high thermal conductivity. Furthermore, 1,3,5-tris(4-aminophenyl)benzene and 1,3,5-tris(4-hydroxyphenyl)benzene have three reactive groups in a molecule thereof, and therefore form a robust resin structure with a high crosslink density together with epoxy groups of the epoxy compound. Hence, in a cured resin product that is a reaction product of the epoxy compound, higher thermal conductivity and heat resistance are achieved.

Furthermore, the present invention provides a laminate including the inorganic filler-containing epoxy resin cured product. The laminate includes the inorganic filler-containing epoxy resin cured product, which has the above features, so it has a high thermal conductivity and a high tracking resistance, and can maintain excellent reliability over a long period.

The present invention can provide an inorganic filler-containing epoxy resin cured product having a high thermal conductivity and a tracking resistance as well as a laminate including the same.

DETAILED DESCRIPTION OF EMBODIMENTS

Figure 1:
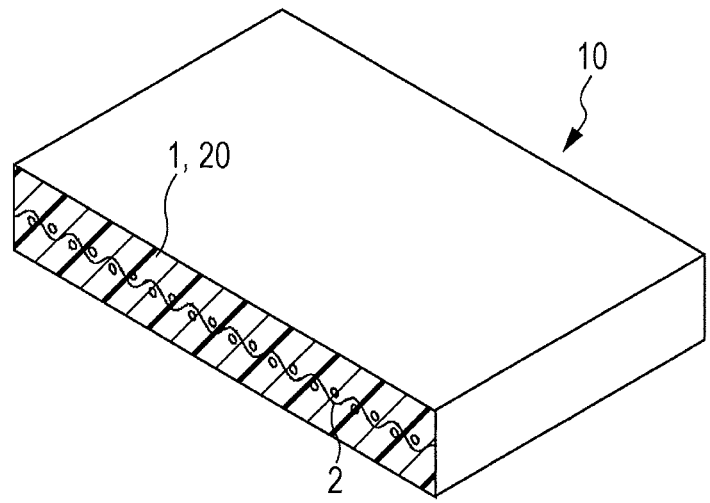
FIG. 1 is a schematic view of a resin sheet used in an embodiment of the present invention.

Embodiments of the present invention will be described below. The embodiments are exemplification for describing the present invention. The present invention is not limited to the embodiments. Various modifications can be made without departing from the scope of the present invention.

The inorganic filler-containing epoxy resin cured product according to an embodiment of the present invention contains a magnesium oxide powder and has a maximum thermogravimetric mass loss rate $\Delta R_{max}$ of −0.20 mass percent/° C. or more within a temperature range of 300° C. to 500° C. The term "maximum thermogravimetric mass loss rate $\Delta R_{max}$" refers to the maximum of the absolute value of a thermogravimetric mass loss rate $\Delta R_t$ which is negative.

The cured epoxy resin product according to an embodiment of the present invention contains at least an epoxy compound. For example, glycidyl ethers, glycidyl esters, glycidyl amines, and the like can be used as the epoxy compound without any limitations. A plurality of epoxy compounds can be used. In order to achieve higher thermal conductivity, each molecule of the epoxy compound preferably contains a mesogenic group having two or more benzene rings such as biphenyl group and terphenyl group. This allows the stacking properties of benzene rings to be highly achieved between epoxy compounds having mesogenic groups or other compounds having mesogenic groups. The increase in stacking properties between the mesogenic groups have a suppressive action on the scattering of phonons which becomes the reason of the decrease on the thermal conductivity of the cured resin product, and thus it is preferable in achieving a high thermal conductivity.

The epoxy compound is more preferably at least one selected from the group consisting of glycidyl ethers (for example, ethers having a biphenyl group, such as biphenyl glycidyl ether and tetramethylbiphenyl glycidyl ether) having a biphenyl group and two or more epoxy groups in a molecule thereof and glycidyl ethers having a mesogenic group such as a terphenyl group. In particular, biphenyl glycidyl ether is preferred because biphenyl glycidyl ether contains a benzene ring with no alkyl group, and thus it has a high crystallinity, is flame-retardant, and is effective from the viewpoint of thermal conductivity and flame resistance.

The cured epoxy resin product according to the embodiment contains 1,3,5-tris(4-aminophenyl)benzene or 1,3,5-tris(4-hydroxyphenyl)benzene.

The active hydrogen atoms of three amino groups in a molecule of 1,3,5-tris(4-aminophenyl)benzene respectively reacts with the epoxy group of the epoxy compound, thereby forming a robust resin structure with a high crosslink density. Furthermore, 1,3,5-tris(4-aminophenyl)benzene is flame-retardant and therefore is preferred from the viewpoint (action) of thermal conductivity and flame resistance. This is because in the case that 1,3,5-tris(4-aminophenyl)benzene reacts with a low-molecular weight epoxy compound, the crosslink density between molecule chains is particularly high.

A compound capable of obtaining a similar effect is 1,3,5-tris(4-hydroxyphenyl)benzene, which has the same main skeleton as that of 1,3,5-tris(4-aminophenyl)benzene. The active hydrogen atoms of three hydroxy groups in a molecule of 1,3,5-tris(4-hydroxyphenyl)benzene respectively reacts with the epoxy group of the epoxy compound, thereby forming a robust resin structure with a high crosslink density.

For the blending ratio of the epoxy compound to 1,3,5-tris(4-aminophenyl)benzene, the number of moles of active hydrogen in amino groups of 1,3,5-tris(4-aminophenyl)benzene preferably ranges from 80 to 130 relative to 100 moles of the epoxy group of the epoxy compound. This range allows the crosslink density of the epoxy compound and 1,3,5-tris(4-aminophenyl)benzene to be increased. Therefore, a cured resin product characteristically having extremely low thermogravimetric mass loss at high temperature (300° C. to 500° C.) can be obtained. Furthermore, when the blending amount of 1,3,5-tris(4-aminophenyl)benzene is excessively high, the thermogravimetric mass loss of the cured resin product tends to be increased although the thermal conductivity thereof is increased. Additionally, when the blending amount of 1,3,5-tris(4-aminophenyl)benzene is excessively low, the thermal conductivity thereof tends to be reduced.

The number of moles of active hydrogen in amino groups of 1,3,5-tris(4-aminophenyl)benzene is preferably 90 to 120 relative to 100 moles of the epoxy group of the epoxy compound from the viewpoint of heat resistance, and thus the glass transition temperature becomes 160° C. or higher. It is not preferred that the number of moles of active hydrogen in amino groups of 1,3,5-tris(4-aminophenyl)benzene is less than 80 or greater than 130 relative to 100 moles of the epoxy group of the epoxy compound, because the glass transition temperature may possibly be 150° C. or lower.

An epoxy group usually reacts with an active hydrogen of an amino group. Therefore, the molar ratio of the epoxy group of the epoxy compound to active hydrogen in 1,3,5-tris(4-aminophenyl)benzene is more preferably 100:100.

As for the blending ratio of the epoxy compound to 1,3,5-tris(4-hydroxyphenyl)benzene, the number of moles of active hydrogen in hydroxy groups of 1,3,5-tris(4-hydroxyphenyl)benzene preferably ranges from 80 to 130 relative to 100 moles of the epoxy group of the epoxy compound. This range allows the crosslink density of the epoxy compound and 1,3,5-tris(4-hydroxyphenyl)benzene to be increased. Thus, a cured resin product characteristically having a extremely low thermogravimetric mass loss at high temperature (300° C. to 500° C.) can be obtained. Furthermore, when the blending ratio of 1,3,5-tris(4-hydroxyphenyl)benzene is excessively high, the thermogravimetric mass loss of the cured resin product tends to be increased although the thermal conductivity thereof is increased. Additionally, when the blending ratio of 1,3,5-tris(4-hydroxyphenyl)benzene is excessively small, the thermal conductivity thereof tends to be reduced.

The number of moles of active hydrogen in hydroxy groups of 1,3,5-tris(4-hydroxyphenyl)benzene preferably ranges from 90 to 120 relative to 100 moles of the epoxy group of the epoxy compound from the viewpoint of heat resistance, and thus the glass transition temperature is 160° C. or higher. It is not preferred that the number of moles of active hydrogen in hydroxy groups of 1,3,5-tris(4-hydroxyphenyl)benzene is less than 80 or greater than 130 relative to 100 moles of the epoxy group of the epoxy compound, because the glass transition temperature may possibly be 150° C. or lower.

Therefore, the molar ratio of the epoxy group of the epoxy compound to active hydrogen in 1,3,5-tris(4-hydroxyphenyl)benzene is more preferably 100:100.

An epoxy resin cured product containing no inorganic filler preferably has a thermal conductivity of 0.30 W/(m·K) or more as determined by, for example, a laser flash method. In the case of making laminates and composite substrates, an inorganic filler is added to increase the thermal conductivity. When the thermal conductivity of the epoxy resin cured product containing no inorganic filler is less than 0.30 W/(m·K), it is difficult for laminates and composite substrates obtained therefrom to have a thermal conductivity of 2.0 W/(m·K). Further, a laminate and a composite substrate obtained from the inorganic filler-containing epoxy resin cured product preferably have a thermal conductivity of 2.0 W/(m·K) or more. When the thermal conductivity of the laminate or the composite substrate is less than 2.0 W/(m·K), sufficient heat dissipation is not achieved in heat dissipation applications such as LED substrates.

The laminate and composite substrate obtained by using the inorganic filler-containing epoxy resin cured product are required to have a high thermal conductivity and the function of preventing the occurrence of electric fires due to a tracking phenomenon. The tracking phenomenon is a phenomenon in which conductive carbon paths are formed on the surface of an insulator by micro-discharges that are repeated in such a state that a contaminant such as an electrolyte solution is attached to the surface of the insulator, thereby causing dielectric breakdown. In order to avoid the tracking phenomenon, it is necessary to prevent the epoxy resin cured product from being decomposed and thus prevent conductive carbon paths from being formed. Therefore, the use of an epoxy resin cured product excellent in thermal decomposition properties (unlikely to be thermally decomposed) is effective.

As described above, the thermal conductivity of the epoxy resin cured product containing no inorganic filler is 0.30 W/(m·K) or more as determined by, for example, the laser flash method. When a high voltage is applied to the epoxy resin cured product containing no inorganic filler, the epoxy resin cured product is subjected to a high temperature and therefore the decomposition of resin is caused. The presence of the inorganic filler in the epoxy resin cured product ensures the heat dissipation of the inorganic filler-containing epoxy resin cured product and avoids the epoxy resin cured product to be high temperature.

However, when the filling amount of the inorganic filler is excessively large, the amount of an epoxy resin (cured product) surrounding the inorganic filler becomes small and a coating on the surface of the inorganic filler is thin; hence, the function of protecting the inorganic filler from an electrolyte solution is reduced. Therefore, in order to allow the laminate and composite substrate obtained by using the inorganic filler-containing epoxy resin cured product to have high heat dissipation properties and excellent tracking resistance, the filling factor of the inorganic filler in the epoxy resin cured product needs to be within a predetermined range.

When the inorganic filler used is the magnesium oxide powder, the filling factor of the magnesium oxide powder in the inorganic filler-containing epoxy resin cured product preferably ranges from 45% to 63% by volume. When the filling factor of the magnesium oxide powder in the inorganic filler-containing epoxy resin cured product is less than 45% by volume, the heat dissipation of the inorganic filler-containing epoxy resin cured product is low. And, when the filling factor of the magnesium oxide powder in the inorganic filler-containing epoxy resin cured product is more than 63% by volume, a coating of the epoxy resin (cured product) that covers the magnesium oxide powder is thin and therefore the magnesium oxide powder is likely to be dissolved in an electrolyte solution applied thereto. In this case, the heat dissipation of the inorganic filler-containing epoxy resin cured product is reduced and the thermal decomposition of the epoxy resin (cured product) occurs when a high voltage is applied thereto. In either case, sufficient tracking resistance cannot be ensured.

Whether the tracking phenomenon is unlikely to occur can be ascertained by evaluating the thermogravimetric mass loss rate of the inorganic filler-containing epoxy resin cured product. In particular, during testing tracking resistance, a high voltage is applied between two platinum electrodes, and the surface of the epoxy resin cured product is heated to a high temperature, i.e., about 300° C. to 500° C., when an electrolyte solution is dropped thereon. The electrolyte solution is instantly boiled and is evaporated. In order to inhibit the promotion of resin decomposition, the thermogravimetric mass loss is preferably small. In particular, the drastic change in morphology of the surface of the inorganic filler-containing epoxy resin cured product due to instant mass loss needs to be avoided.

The thermogravimetric mass loss rate is a value obtained by differentiating the mass loss of a measurement object by a change in temperature. A calculation method used herein is described below. The absolute value of the maximum thermogravimetric mass loss rate $\Delta R_{max}$ is preferably small (close to 0). When the inorganic filler used is the magnesium oxide powder, the maximum thermogravimetric mass loss rate $\Delta R_{max}$ of the inorganic filler-containing epoxy resin cured product is preferably −0.20 mass percent/° C. or more. When the maximum thermogravimetric mass loss rate $\Delta R_{max}$ is within this range, the change in morphology of the surface of the inorganic filler-containing epoxy resin cured product during dropping the electrolyte solution is small and the formation of conductive carbon paths can be suppressed.

The term "high heat resistance" refers to resistance necessary to maintain the strength of a base material, such as a substrate, including a cured resin product at a temperature higher than the environment temperature in which the base material is expected to be used. The heat resistance can be ascertained by evaluating the glass transition temperature of a composition. In general, the usage environment temperature required for a base material such as a substrate varies depending on components used and applications and is about 120° C. from the viewpoint that the heat resistance of the base material needs to be not lower than that of a mounted component. Therefore, the glass transition temperature that is used as an index of heat resistance needs to be sufficiently higher than the above mentioned temperature, i.e., 150° C. or higher, and is preferably 160° C. or higher.

In particular, when the cured resin product is thermosetting, the elastic modulus of resin drops dramatically and a reduction in strength including bending strength and peeling strength occurs at a high temperature not lower than the glass transition temperature at which the cured resin product transforms from a glassy state to a rubbery state. Therefore, effective mechanical properties at high temperature can be achieved by sufficiently increasing the glass transition temperature. That is, heat resistance at a high environmental temperature can be achieved by increasing the glass transition temperature of the cured resin product.

A resin composition containing an epoxy resin, a curing agent, and the like, to be converted into the cured epoxy resin product can be used in such a manner that the resin composition is uniformly dissolved or dispersed in a solvent. The solvent used herein is not particularly limited as long as the solvent can dissolve or disperse the epoxy compound and 1,3,5-tris(4-aminophenyl)benzene or 1,3,5-tris(4-hydroxyphenyl)benzene. Examples of the solvent include methyl ethyl ketone, methyl cellosolve, methyl isobutyl ketone, dimethylformamide, propylene glycol monomethyl ether, toluene, xylene, acetone, N-methylpyrrolidone, γ-butyrolactone, and mixtures of these solvents.

The resin composition may be used in combination with a curing agent for epoxy compounds, such as phenol, amine, or acid anhydride, in addition to 1,3,5-tris(4-aminophenyl)benzene or 1,3,5-tris(4-hydroxyphenyl)benzene. In addition, the resin composition may contain other components as required. Examples of such components include curing catalysts (curing accelerators) such as phosphines and imidazoles (2-ethyl-4-methylimidazole and the like), coupling agents such as silane coupling agents and titanate coupling agents, flame retardants such as halogen compounds and phosphorus compounds, diluents, plasticizers, and lubricants.

The inorganic filler is preferably magnesium oxide because magnesium oxide is inexpensive, has a high thermal conductivity (42 W/(m·K) to 60 W/(m·K)) and a high volume resistivity (>$10^{14}$ Ω·cm), and is insulating. The inorganic filler may be used in combination with an electrically non-conductive filler such as alumina, aluminium hydroxide, aluminium nitride, boron nitride, or silica, whereby an electrically non-conductive resin composition with a high heat dissipation is obtained.

The term "resin sheet" refers to a sheet of an inorganic filler-containing epoxy resin composition only, a sheet prepared by coating an inorganic filler-containing epoxy resin composition onto a support such as metal foil or a resin film made of PET or the like, and a sheet prepared in such a manner that a core such as a fiber in the form of fabric or nonwoven fabric is impregnated or covered with an inorganic filler-containing epoxy resin composition diluted with a solvent, these sheets being semi-cured or uncured. FIG. 1 shows a schematic view of the resin sheet 10 used in this embodiment. The resin sheet 10 is made from an inorganic filler-containing epoxy resin composition 1 and a core 2, and it is processed into a sheet. The inorganic filler-containing epoxy resin composition 1 is cured into an inorganic filler-containing epoxy resin cured product 20.

The core 2, which is used in the resin sheet 10, can be appropriately selected from various known cores. Examples of the core 2 include, but are not limited to, fabrics and nonwoven fabrics made from glass fibers, carbon fibers, metal fibers, natural fibers, or synthetic fibers such as polyester fibers or polyamide fibers. These fabrics and nonwoven fabrics can be used alone or in combination. Further, the thickness of the core 2 is not particularly limited and may be appropriately set depending on the thickness of the resin sheet 10 or the thickness of the laminate, the desired mechanical strength, dimensional stability, or the like. The thickness of the core 2 is usually about 0.03 mm to 0.20 mm.

For example, heat is applied to the inorganic filler-containing epoxy resin composition 1, whereby the inorganic filler-containing epoxy resin composition 1 is cured into the inorganic filler-containing epoxy resin cured product 20. A method for producing the inorganic filler-containing epoxy resin cured product 20 is not particularly limited. Examples of this method include a method in which the inorganic filler-containing epoxy resin composition 1 is heated and dried in such a state that the inorganic filler-containing epoxy resin composition 1 is held in a die, and a method in which the inorganic filler-containing epoxy resin composition 1 is cured by heating in a step of manufacturing a laminate below.

As for the resin sheet 10 of this embodiment, the core 2 is impregnated with the inorganic filler-containing epoxy resin composition 1 by application, immersion, or the like and then is dried by heating, whereby a solvent used to dissolve the resin composition is removed and the inorganic filler-containing epoxy resin composition 1 is semi-cured. Thus, the resin sheet 10 can be prepared. Herein, the resin sheet 10 is preferably heated at 60° C. to 150° C. for about 1 minute to 120 minutes, and more preferably 70° C. to 120° C. for about 3 minutes to 90 minutes.

The inorganic filler-containing epoxy resin cured product 20 can be obtained in the way that the semi-cured inorganic filler-containing epoxy resin composition 1 of the resin sheet 10 is further reheated at 100° C. to 250° C. for about 1 minute to 300 minutes. Herein, the semi-cured inorganic filler-containing epoxy resin composition 1 may be reheated under pressurized or reduced pressure conditions as required.

Figure 2:
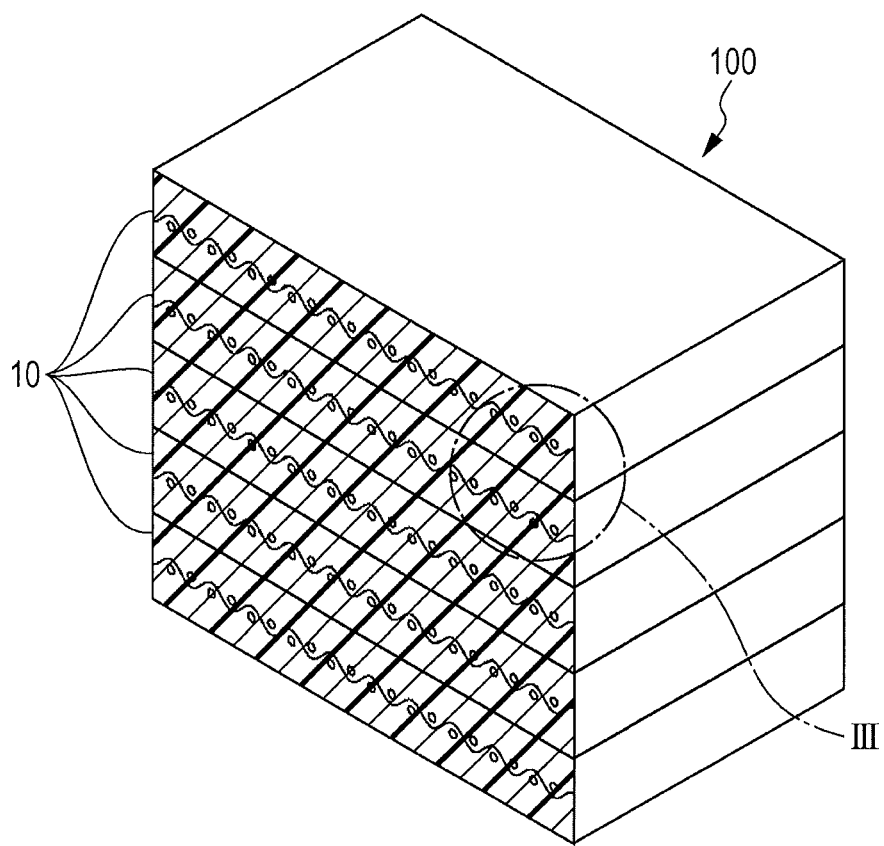
FIG. 2 is a schematic view of a laminate according to an embodiment of the present invention.

FIG. 2 shows a schematic view of a laminate 100 according to an embodiment of the present invention. The laminate 100 can be obtained in such a manner that a plurality of resin sheets 10 are stacked and then are pressed. Herein, cores 2 used in the resin sheets 10 are not particularly limited and may be appropriately set. In the pressing step, when the inorganic filler-containing epoxy resin composition 1 contains, for example, a thermosetting resin, the inorganic filler-containing epoxy resin composition 1 is preferably heated and pressed from the viewpoint of formability.

The laminate 100 may be a single plate obtained by pressing only one resin sheet 10.

Figure 3:
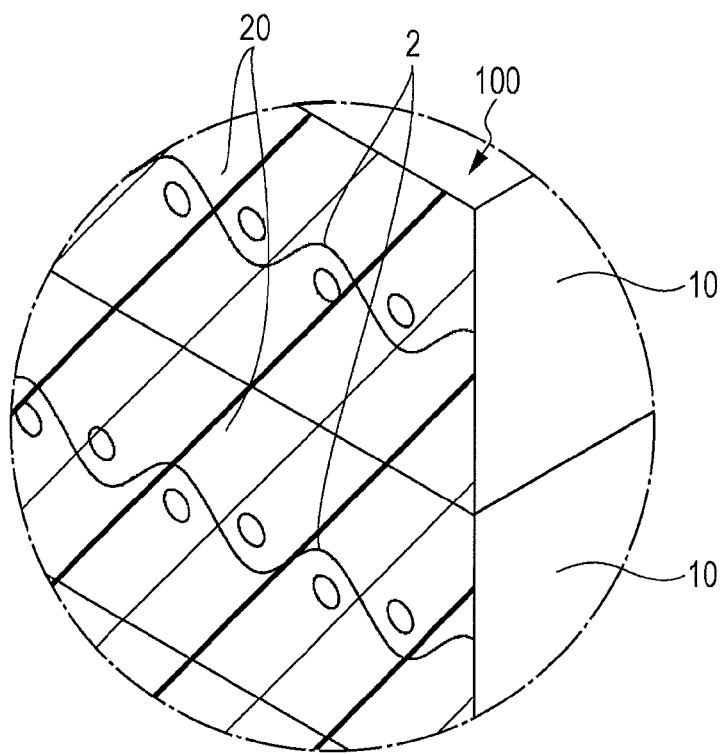
FIG. 3 is an enlarged view of part III of the pressed, heated laminate shown in FIG. 2.

As for the laminate 100, one or a stack of the resin sheets 10 in which inorganic filler-containing epoxy resin compositions 1 are semi-cured is pressed and heated at 100° C. to 250° C. for about 1 minute to 300 minutes. The inorganic filler-containing epoxy resin compositions 1 are thereby cured into the inorganic filler-containing epoxy resin cured products 20, and thus the laminate 100 can be prepared as shown in FIG. 3. One or the stack of the resin sheets 10 may be pressed and heated under vacuum condition as required. A metal-clad laminate can be prepared by providing metal foil or a metal sheet on one or both sides of the laminate 100.

A metal layer used in the metal-clad laminate can be appropriately selected from various known metal layers. Examples of the metal layer include, but are not limited to, sheets and foils of metals such as copper, nickel, and aluminium. The thickness of the metal layer is not particularly limited and is usually about 3 μm to 150 μm.

Furthermore, a composite substrate can be obtained by etching or piercing the metal-clad laminate. A method for preparing the metal-clad laminate or the composite substrate is not limited to those described above.

The curing temperature in a method for producing a cured resin product is preferably adjusted to 160° C. to 210° C. in the view that high heat-conducting properties are remarkable. Furthermore, 1,3,5-tris(4-aminophenyl)benzene or 1,3,5-tris(4-hydroxyphenyl)benzene is preferably used as a curing agent because high heat-conducting properties become further remarkable.

Figure 4:
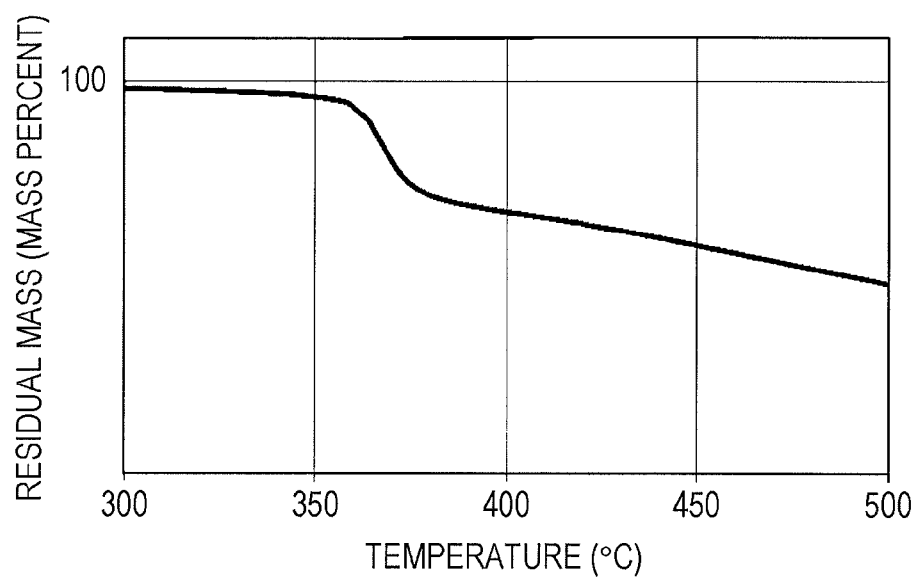
FIG. 4 is an example of a thermogravimetric mass loss chart of an inorganic filler-containing epoxy resin cured product according to an embodiment of the present invention.

FIG. 4 shows an example of a thermogravimetric mass loss chart of the inorganic filler-containing epoxy resin cured product according to the embodiment of the present invention. A certain amount of the inorganic filler-containing epoxy resin cured product is taken as the sample, then heated at a predetermined heating rate and is measured for mass. In FIG. 4, the abscissa represents the temperature of the sample, and the ordinate represents the residual mass of the sample in the form of a normalized value (mass percent) determined on the basis of the mass of the sample at room temperature (the beginning of measurement) being 100% by mass.

Figure 5:
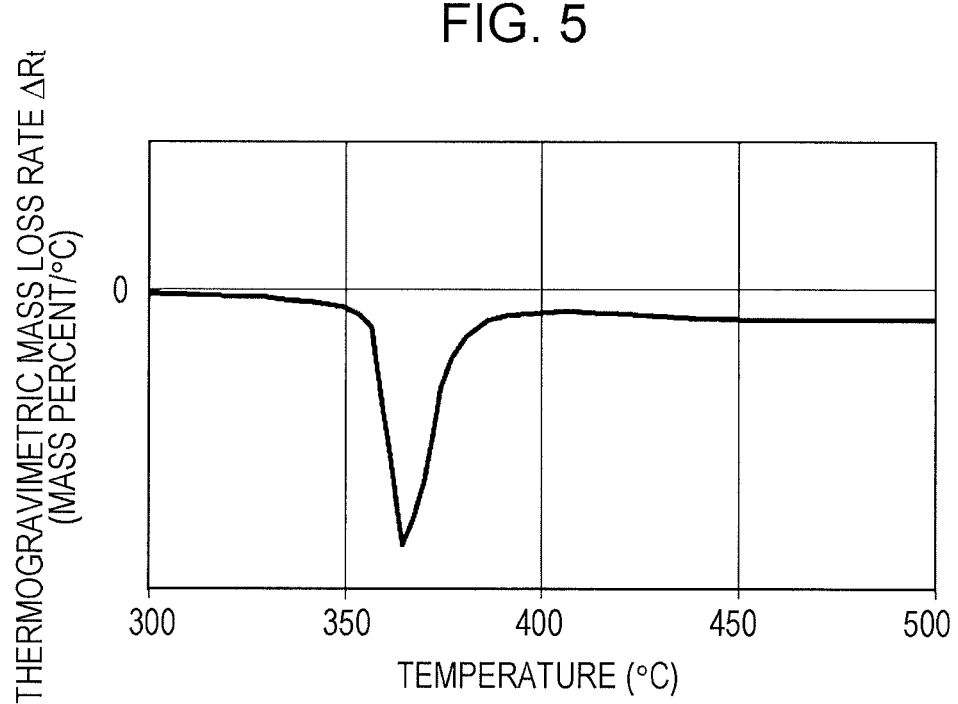
FIG. 5 is an example of a thermogravimetric mass loss rate chart of an inorganic filler-containing epoxy resin cured product according to an embodiment of the present invention.

FIG. 5 shows an example of a thermogravimetric mass loss rate chart of the inorganic filler-containing epoxy resin cured product according to the embodiment. In FIG. 5, the abscissa represents the temperature, and the ordinate represents a differential value obtained by differentiating the thermogravimetric mass loss of the inorganic filler-containing epoxy resin cured product by the temperature thereof. The differential value is defined as a thermogravimetric mass loss rate $\Delta R_t$. In addition, the maximum thermogravimetric mass loss rate $\Delta R_{max}$ is defined as the value which is the minimum (which is negative and whose absolute value is maximum) of the thermogravimetric mass loss rate $\Delta R_t$ within a predetermined temperature range.

The maximum thermogravimetric mass loss rate $\Delta R_{max}$ can be adjusted by, for example, a combination of the epoxy compound and the curing agent or the blending ratio thereof. The increase in crosslink density of the epoxy resin cured product enhances heat resistance properties and increases the maximum thermogravimetric mass loss rate $\Delta R_{max}$ (which is negative and whose absolute value becomes smaller). In contrast, the reduction in crosslink density of the epoxy resin cured product reduces heat resistance properties and reduces the maximum thermogravimetric mass loss rate $\Delta R_{max}$ (which is negative and whose absolute value becomes larger). When the inorganic filler is contained in the epoxy resin cured product, the maximum thermogravimetric mass loss rate $\Delta R_{max}$ can be adjusted by varying the filling factor of the inorganic filler in the epoxy resin cured product. The increase in the filling factor of the inorganic filler reduces the content of organic matter, i.e., the epoxy resin cured product, and increases the maximum thermogravimetric mass loss rate $\Delta R_{max}$ (which is negative and whose absolute value becomes smaller). In contrast, the reduction in the filling factor of the inorganic filler increases the content of organic matter, i.e., the epoxy resin cured product, and reduces the maximum thermogravimetric mass loss rate $\Delta R_{max}$ (which is negative and whose absolute value becomes larger).

EXAMPLES

The present invention is further described in detail with reference to examples and comparative examples below.

Example 1

In order to prepare a resin-filler solution for producing an epoxy resin cured product, materials below were prepared.

Epoxy resin (a mixture of 50% of a tetramethylbiphenol-type epoxy resin and 50% of a 4,4'-biphenol-type epoxy resin, an epoxy equivalent of 175 g/eq, YL-6121H produced by Mitsubishi Chemical Corporation): 75 parts by mass Curing agent (1,3,5-tris(4-aminophenyl)benzene, an active hydrogen equivalent of 59 g/eq): 25 parts by mass Curing accelerator (2-ethyl-4-methylimidazole, 2E4MZ produced by Shikoku Chemicals Corporation): 1 part by mass Methyl ethyl ketone: 94 parts by mass These materials were charged into a medialess disperser (DESPA MILL MD-10 manufactured by Asada Iron Works Co., Ltd.) and were mixed together, whereby a resin mixture solution was prepared. Next, a magnesium oxide powder (an average particle size of 10 μm and a thermal conductivity of 45 W/(m·K)) was added to the resin mixture solution and then was well dispersed by stirring, whereby the resin-filler solution was prepared. In this operation, the amount of the magnesium oxide powder was adjusted to be 58% by volume (called as the filling factor below) when the volume of the solid content obtained by removing methyl ethyl ketone from the resin-filler solution was regarded as 100% by volume. Further, the glass fiber fabric with a thickness of 0.1 mm was impregnated with the resin-filler solution, followed by removing methyl ethyl ketone by heating and drying at 100° C., whereby a resin sheet was obtained. Furthermore, six of the resin sheets were stacked, were heated and pressed for 20 minutes at a temperature of 170° C. with a pressure of 1 MPa, followed by heating and pressing again at a temperature of 200° C. for 1 hour with a pressure of 4 MPa, whereby a 0.6 mm thick laminate including an inorganic filler-containing epoxy resin cured product was prepared.

Example 2

A laminate was prepared in substantially the same manner as that described in Example 1 except that the type and amount of an epoxy resin used and the amount of a curing agent used were as described below.

Epoxy resin (a diaminodiphenylmethane-type epoxy resin, an epoxy equivalent of 118 g/eq, YH-434 produced by Nippon Steel & Sumikin Chemical Co., Ltd.): 67 parts by mass Curing agent (1,3,5-tris(4-aminophenyl)benzene): 33 parts by mass

Example 3

A laminate was prepared in substantially the same manner as that described in Example 1 except that the filling factor of a magnesium oxide powder (an average particle size of 10 μm) was adjusted to be 29% by volume and the filling factor of a magnesium oxide powder (an average particle size of 50 μm and a thermal conductivity of 45 W/(m·K)) was adjusted to be 29% by volume.

Example 4

A laminate was prepared in substantially the same manner as that described in Example 1 except that the filling factor of the magnesium oxide powder (an average particle size of 50 μm) was adjusted to be 58% by volume.

Example 5

A laminate was prepared in substantially the same manner as that described in Example 1 except that the filling factor of the magnesium oxide powder (an average particle size of 10 μm) was adjusted to be 48% by volume.

Example 6

A laminate was prepared in substantially the same manner as that described in Example 1 except that the type and amount of the curing agent used was as described below and the filling factor of the magnesium oxide powder (an average particle size of 10 μm) was adjusted to be 48% by volume.
Curing agent (1,3,5-tris(4-hydroxyphenyl)benzene, an active hydrogen equivalent of 118 g/eq): 50 parts by mass

Example 7

A laminate was prepared in substantially the same manner as that described in Example 1 except that the filling factor of the magnesium oxide powder (an average particle size of 10 μm) was adjusted to be 45% by volume.

Example 8

A laminate was prepared in substantially the same manner as that described in Example 1 except that the filling factor of the magnesium oxide powder (an average particle size of 10 μm) was adjusted to be 63% by volume.

Comparative Example 1

A laminate was prepared in substantially the same manner as that described in Example 1 except that the filling factor of the magnesium oxide powder (an average particle size of 10 μm) was adjusted to be 65% by volume.

Comparative Example 2

A laminate was prepared in substantially the same manner as that described in Example 1 except that the filling factor of the magnesium oxide powder (an average particle size of 10 μm) was adjusted to be 43% by volume.

Comparative Example 3

A laminate was prepared in substantially the same manner as that described in Example 1 except that the types and amounts of epoxy resins used and the type and amount of a curing agent used were as described below.
Epoxy resin (YL-6121H produced by Mitsubishi Chemical Corporation): 18 parts by mass
Epoxy resin (a brominated bisphenol-A-type epoxy resin, an epoxy equivalent of 650 g/eq, YDB-406P produced by Tohto Kasei Co., Ltd.): 16 parts by mass
Epoxy resin (a bisphenol-A-type epoxy resin, an epoxy equivalent of 185 g/eq, 840-S produced by DIC Corporation): 18 parts by mass
Curing agent (a biphenyl aralkyl resin, an active hydrogen equivalent of 211 g/eq, HE-200C-90 produced by Air Water Inc.): 48 parts by mass

Comparative Example 4

A laminate was prepared in substantially the same manner as that described in Example 1 except that the types and amounts of epoxy resins used and the type and amount of a curing agent used were as described below.
Epoxy resin (840-S produced by DIC Corporation): 21 parts by mass
Epoxy resin (YDB-406P produced by Tohto Kasei Co., Ltd.): 10 parts by mass
Epoxy resin (a hydrogenated bisphenol-A-type epoxy resin, an epoxy equivalent of 230 g/eq, ST-3000 produced by Nippon Steel & Sumikin Chemical Co., Ltd.): 21 parts by mass
Curing agent (HE-200C-90 produced by Air Water Inc.): 47 parts by mass

Comparative Example 5

A laminate was prepared in substantially the same manner as that described in Example 1 except that the types and amounts of epoxy resins used and the type and amount of a curing agent used were as described below.
Epoxy resin (YDB-406P produced by Tohto Kasei Co., Ltd.): 37 parts by mass
Epoxy resin (840-S produced by DIC Corporation): 37 parts by mass
Curing agent (a phenol resin, an active hydrogen equivalent of 104 g/eq, TD-2093Y produced by DIC Corporation): 27 parts by mass The laminates prepared in Examples 1 to 8 and Comparative Examples 1 to 5 were evaluated by methods below.
(Evaluation of Thermogravimetric Mass Loss)
A 3 mm square sample was cut from the laminate prepared in each of Examples 1 to 8 and Comparative Examples 1 to 5, was processed, and then was put in an aluminium pan. The sample was heated from room temperature to 500° C. at a heating rate of 10° C./minute by using a thermogravimetric/differential thermal analyzer (TG/DTA, manufactured by Seiko Instruments Inc.), and was measured for sample mass $W_t$ (g) and temperature $T_t$ (° C.) at intervals of 0.1 minutes. The thermogravimetric mass loss rate $\Delta R_t$ at t minutes after the start of measurement was calculated by the following equation (1).

$$\Delta R_t = (W_{t+0.1} - W_t)/(W_0 \times (T_{t+0.1} - T_t)) \times 100 \tag{1}$$

wherein $W_0$ is the initial mass (g) of the sample, $W_t$ is the mass (g) of the sample measured at t minutes after the start of measurement, $W_{t+0.1}$ is the mass (g) of the sample measured at (t+0.1) minutes after the start of measurement, $T_t$ is the temperature (° C.) of the sample measured at t minutes after the start of measurement, and $T_{t+0.1}$ is the temperature (° C.) of the sample measured at (t+0.1) minutes after the start of measurement.

The thermogravimetric mass loss rate $\Delta R_t$ (mass percent/° C.) was calculated at a sample temperature $T_t$ ranging from 300° C. to 500° C. and the minimum (which is negative and whose absolute value is maximum) thereof was defined as the maximum thermogravimetric mass loss rate $\Delta R_{max}$ (mass percent/° C.). Incidentally, in the above examples, glass fiber fabric with a thickness of 0.1 mm was used as a core. In this case, the thermogravimetric mass loss rate of each inorganic filler-containing epoxy resin cured product was calculated by subtracting the mass of the glass fiber fabric measured under the same conditions.

(Evaluation of Tracking Resistance)

The tracking resistance test was performed as specified in JIS C 2134 in such a manner that two chisel-shaped electrodes, equipped with a platinum tip, having a width of 5 mm, a thickness of 2 mm, and a point angle of 30° were brought into contact with test pieces obtained from the laminate prepared in each of Examples 1 to 8 and Comparative Examples 1 to 5 under the following conditions: an interelectrode distance of 4.0±0.1 mm and an electrode load of 1±0.05 N. A test voltage, that is, a sinusoidal voltage of 100 V to 600 V was applied between the two electrodes, 50 droplets of an aqueous electrolyte solution (a resistivity of 3.95±0.05 Ω·cm) containing 0.1%±0.002% by mass of ammonium chloride were dropped between the two electrodes at intervals of 30±5 seconds, and the maximum voltage (CTI value) at which all five of the test pieces were not broken was determined. The case where a current of 0.5 A or more flowed between the two electrodes for 2 seconds was judged to be inadequate because a tracking phenomenon was regarded as being caused. Herein, a test piece with a CTI value of 400 V or more was judged to have sufficient tracking resistance.

(Evaluation of Thermal Conductivity)

As for the evaluation of thermal conductivity, the thermal conductivity of the inorganic filler-containing epoxy resin cured products was measured. Each of the laminates, prepared in Examples 1 to 8 and Comparative Examples 1 to 5, including the inorganic filler-containing epoxy resin cured products was machined into a disk shape with a diameter of 10 mm, whereby a measurement sample was prepared. The obtained measurement sample was measured for thermal diffusivity coefficient $\alpha$ (m$^2$/s) by using a thermal conductivity measuring apparatus (TC series manufactured by ULVAC-RIKO, Inc.). Furthermore, the specific heat Cp (J/(kg·K)) of the measurement sample was measured by differential thermal analysis (DSC) using sapphire as a reference sample. The density r (kg/m$^3$) of the measurement sample was measured by the Archimedes' method. The thermal conductivity λ (W/(m·K)) was calculated from these parameters by the following equation (2).

$$\lambda = \alpha \times Cp \times r \quad (2)$$

wherein a is the thermal diffusivity coefficient (m$^2$/s) of the measurement sample, Cp is the specific heat (J/(kg·K)) thereof, and r is the density (kg/m$^2$) thereof.

Herein, a measurement sample with a thermal conductivity λ of 2.0 W/(m·K) or more was judged to have a sufficiently high thermal conductivity.

Table 1 shows the species of the curing agent used in Examples 1 to 8 and Comparative Examples 1 to 5, the filling factor of the magnesium oxide powders, and characteristics of the laminates.

TABLE 1

| | Species of curing agent | Filling factor of magnesium oxide | | Thermal decomposition properties $\Delta R_{max}$ [Mass percent/° C.] | Tracking resistance CTI value [V] | Heat dissipation properties Thermal conductivity λ [W/(m·K)] |
|---|---|---|---|---|---|---|
| | | Particle size of 10 μm [Volume percent] | Particle size of 50 μm [Volume percent] | | | |
| Example 1 | TAPB*[1] | 58 | 0 | −0.11 | 600 | 2.7 |
| Example 2 | TAPB*[1] | 58 | 0 | −0.11 | 600 | 2.9 |
| Example 3 | TAPB*[1] | 29 | 29 | −0.11 | 600 | 2.7 |
| Example 4 | TAPB*[1] | 0 | 58 | −0.11 | 600 | 2.7 |
| Example 5 | TAPB*[1] | 48 | 0 | −0.18 | 550 | 2.1 |
| Example 6 | THPB*[2] | 48 | 0 | −0.18 | 550 | 2.1 |
| Example 7 | TAPB*[1] | 45 | 0 | −0.20 | 550 | 2.0 |
| Example 8 | TAPB*[1] | 63 | 0 | −0.10 | 400 | 3.3 |
| Comparative Example 1 | TAPB*[1] | 65 | 0 | −0.07 | 350 | 3.5 |
| Comparative Example 2 | TAPB*[1] | 43 | 0 | −0.24 | 375 | 1.8 |
| Comparative Example 3 | Biphenyl | 48 | 0 | −0.41 | 225 | 1.4 |
| Comparative Example 4 | Biphenyl | 48 | 0 | −0.44 | 225 | 1.3 |
| Comparative Example 5 | Phenol | 48 | 0 | −0.85 | 225 | 1.7 |

*[1] 1,3,5-tris(4-aminophenyl)benzene
*[2] 1,3,5-tris(4-hydroxyphenyl)benzene

In the measurement of thermogravimetric mass loss, it could be confirmed that the inorganic filler-containing epoxy resin cured product prepared in Examples 1 to 8 had a maximum thermogravimetric mass loss rate $\Delta R_{max}$ of −0.20 mass percent/° C. or more within a temperature range of 300° C. to 500° C. Furthermore, since these inorganic filler-containing epoxy resin cured product contained the magnesium oxide powders, which have a high thermal conductivity, the high heat dissipation could be maintained and therefore a high tracking resistance (a CTI value of 400 V or more) could be achieved.

The inorganic filler-containing epoxy resin cured products prepared in Examples 1 to 8 had a high tracking resistance and exhibited a thermal conductivity of 2.0 W/(m·K) or more because the filling factors of the magnesium oxide powders in the inorganic filler-containing epoxy resin cured products were 45% to 63% by volume. It could be confirmed that the laminates also had excellent properties.

In Comparative Example 1, since the filling factor of the magnesium oxide powder in the inorganic filler-containing epoxy resin cured product was up to 65% by volume, a high thermal conductivity of over 2.0 W/(m·K) was achieved, and the maximum thermogravimetric mass loss rate $\Delta R_{max}$ of the epoxy resin cured product was −0.07 mass percent/° C. within a temperature range of 300° C. to 500° C.; however, the volume occupied by resin in the inorganic filler-containing epoxy resin cured product was reduced, a resin coating surrounding the magnesium oxide powder became thin, the heat dissipation of the surface of the inorganic filler-containing epoxy resin cured product was reduced due to the dissolution of the magnesium oxide powder, and as a result, the CTI value of tracking resistance was below 400 V. On the other hand, in Comparative Example 2, the filling factor of the magnesium oxide powder in the inorganic filler-containing epoxy resin cured product was as low as 43% by volume, the heat dissipation of the inorganic filler-containing epoxy resin cured product was insufficient, the carbonization of resin was accelerated due to the high temperature of the epoxy resin cured product during the application of high voltage in the tracking resistance test, and as a result, the CTI value of tracking resistance is below 400 V.

In Comparative Examples 3 to 5, a curing agent, i.e., 1,3,5-tris(4-aminophenyl)benzene or 1,3,5-tris(4-hydroxyphenyl)benzene, was not contained and thus the crosslink density between an epoxy resin and a curing agent could not be sufficiently increased. The maximum thermogravimetric mass loss rate $\Delta R_{max}$ of the inorganic filler-containing epoxy resin cured products was below −0.20 mass percent/° C. within a temperature range of 300° C. to 500° C., the decomposition of the epoxy resin cured products was accelerated during the application of high voltage in the tracking resistance test, the heat dissipation of the surface of the epoxy resin cured products was reduced due to the dissolution of the magnesium oxide powder, and as a result, the CTI value of tracking resistance was below 400 V.

The inorganic filler-containing epoxy resin cured product according to the present invention and a laminate including the same are excellent in thermal conductivity and tracking resistance and therefore can be widely and effectively used as electronic component-equipped substrates, heat-dissipating sheets, modules of insulating materials or the like, and electronic components in the field of electronic device materials required to have high thermal conductivity and reliability.

DESCRIPTION OF REFERENCE NUMERALS

1 Inorganic filler-containing epoxy resin composition
2 Core
10 Resin sheet
20 Inorganic filler-containing epoxy resin cured product
100 Laminate

What is claimed is:

1. An inorganic filler-containing epoxy resin cured product of an epoxy resin composition, wherein the epoxy resin composition comprises: at least one epoxy compound, a curing agent selected from 1,3,5-tris(4-aminophenyl)benzene and 1,3,5-tris(4-hydroxyphenyl)benzene, and a magnesium oxide powder;
   wherein the curing agent is provided in an amount yielding 80 to 130 moles of active hydrogen in the amine groups or the hydroxyl groups of the curing agent relative to 100 moles of epoxy group of the at least one epoxy compound;
   wherein the magnesium oxide powder is provided in an amount yielding a filling factor of 45% to 63% by volume of the inorganic filler-containing epoxy resin cured product; and
   the inorganic filler-containing epoxy resin cured product has a maximum thermogravimetric mass loss rate $\Delta R_{max}$ of −0.20 mass percent/° C. or more within a temperature range of 300° C. to 500° C.

2. A laminate comprising at least one resin sheet, wherein the at least one resin sheet comprises the inorganic filler-containing epoxy resin cured product according to claim 1.

3. The inorganic filler-containing epoxy resin cured product according to claim 1, wherein the at least one epoxy compound comprises an epoxy resin having a mesogenic group.

4. A laminate comprising at least one resin sheet, wherein the at least one resin sheet comprises the inorganic filler-containing epoxy resin cured product according to claim 3.

* * * * *